United States Patent Office 3,309,388
Patented Mar. 14, 1967

3,309,388
NOVEL 4-CHLORO-Δ⁴,⁹,¹¹-GONATRIENES
Robert Bucourt, Clichy-sous-Bois, Andre Pierdet, Noisy-le-Sec, and Germain Costerousse, Montrouge, France, assignors to Roussel—UCLAF, Paris, France, a corporation of France
No Drawing. Filed Apr. 6, 1965, Ser. No. 446,096
Claims priority, application France, Apr. 23, 1964, 972,025
4 Claims. (Cl. 260—397.45)

The invention relates to novel 4-chloro-$\Delta^{4,9,11}$-gonatrienes of the formula

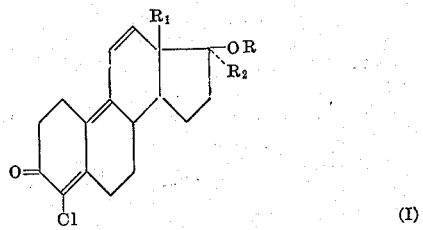

wherein R is selected from the group consisting of hydrogen and an acyl radical of an organic carboxylic acid having 1 to 18 carbon atoms, $R_1$ is the methyl radical, $R_2$ is selected from the group consisting of hydrogen and a lower alkyl radical and to a novel process for their preparation.

The compounds of Formula I possess an interesting physiological activity, particularly a strong anabolic activity in warm-blooded animals. For example, 4 - chloro - 17β - acetoxy - 13β - methyl - $\Delta^{4,9,11}$ - gonatriene-3-one has an anabolic activity almost 20 times greater than 4-chloro-19-nor-testosterone and an anabolic activity distinctly superior to 17β-acetoxy-13β-methyl-$\Delta^{4,9,11}$-gonatriene-3-one as well as having about 50% less androgenic activity as determined on genital organs of test animals.

4 - chloro 13β,17α - dimethyl - $\Delta^{4,9,11}$ - gonatriene-17β-ol-3-one has a very important anabolic activity.

It is an object of the invention to provide novel 4-chloro-$\Delta^{4,9,11}$- gonatriene of Formula I.

It is another object of the invention to provide a novel process for the preparation of 4-chloro-$\Delta^{4,9,11}$-gonatriene of Formula I.

These and other objects and advantages of the invention will become obvious from the following detailed description.

The novel 4-chloro-$\Delta^{4,9,11}$-gonatrienes of the invention have the formula

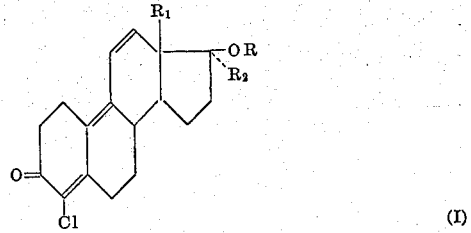

wherein R is selected from the group consisting of hydrogen and an acyl radical of an organic carboxylic acid having 1 to 18 carbon atoms, $R_1$ is the methyl radical, $R_2$ is selected from the group consisting of hydrogen and a lower alkyl radical.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid, cycloalkyl alkanoic acids such as cyclopentyl acetic acid, cyclohexyl acetic acid, cyclopentyl propionic acid and cyclohexyl propionic acid; arylalkanoic acids such as phenyl acetic acids and phenyl propionic acid; aryl carboxylic acids such as benzoic acid and 2,4-dinitrobenzoic acid; phenoxy alkanoic acids such as phenoxy acetic acid, p-chloroacetic acid, 2,4-dichlorophenoxy acetic acid, 4-tert.-butylphenoxy acetic acid, 3-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The novel process of the invention for the preparation of 4-chloro-$\Delta^{4,9,11}$-gonatrienes of Formula I which comprises reacting a 17β-OR-13β-$R_1$-17α-$R_2$-$\Delta^{4,9,11}$-gonatriene-3-one of formula

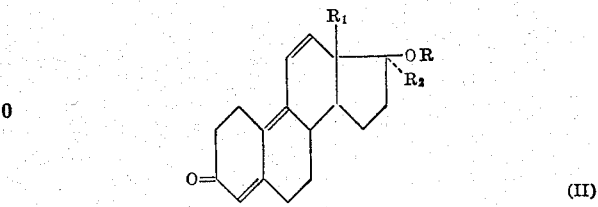

wherein R, $R_1$ and $R_2$ have the above definitions with a chlorinating agent to form the corresponding 4-chloro-17β - OR - 13β - $R_1$ - 17α - $R_2$ - $\Delta^{4,9,11}$ - gonatriene - 3-one. A preferred mode of chlorinating is with sulfuryl chloride, preferably in the presence of a tertiary base such as pyridine or with tert.-butyl hypochlorite in the presence of acetic acid in acetic acid anhydride. The chlorination is usually affected at or near room temperature.

The starting material, 17β-OR-13β-$R_1$-17α-$R_2$-$\Delta^{4,9,11}$-gonatriene-3-one, may be prepared by the process of commonly assigned, copending application Ser. No. 397,628, filed Sept. 18, 1964, now U.S. Pat No. 3,248,294 which comprises reacting 3-chloro-13β-$R_1$-17β-OR'-4,5-seco-$\Delta^{2,9}$-gonadiene-5-one wherein R' is an acyl radical of an organic carboxylic acid of 1 to 18 carbon atoms with an acetic acid esterifying agent under acid conditions to form 3-chloro-5-acetoxy-13β-$R_1$-17β-OR'-4,5-seco-$\Delta^{2,5(10),9(11)}$-gonatriene, brominating the latter in the presence of a tertiary base to form 3-chloro-11-bromo-13β-$R_1$-17β-OR'-4,5-seco-$\Delta^{2,9}$-gonadiene-5-one, dehydrobrominating the latter to form 3-chloro-13β-$R_1$-17β-OR'-4,5-seco-$\Delta^{2,9,11}$-gonatriene-3-one, hydrolyzing the latter under acid conditions to form 13β-$R_1$-17β-OR'-4,5-seco-$\Delta^{9,11}$-gonadiene-3,5-dione and cyclizing the latter under alkaline conditions to form 13β-$R_1$-17-OR'-$\Delta^{4,9,11}$-gonatriene-3-one which can be saponified under alkaline conditions to form the corresponding 13β-$R_1$-$\Delta^{4,9,11}$-gonatriene-17β-ol-3-one, which can be reacted with a compound selected from the group consisting of hydroxylamine and α-lower alkyl hydroxylamines and their acid salts to form the corresponding 3-oximido 13β-$R_1$-$\Delta^{4,9,11}$-gonatriene-17β-ol, oxidizing the latter to form the corresponding 3-oximido 13β-$R_1$-$\Delta^{4,9,11}$-gonatriene-17-one, reacting the latter with a lower alkyl metallic compound to form the corresponding 3-oximido 13β-$R_1$-17α-lower alkyl-$\Delta^{4,9,11}$-gonatriene-17β-ol and hydrolyzing the latter under acidic conditions to form a 13β-$R_1$-17α-lower-alkyl-$\Delta^{4,9,11}$-gonatriene-17β-ol-3-one which can be esterified in the 17-position with an acylating agent of an organic carboxylic acid having 1 to 18 carbon atoms, such as an acid anhydride or acid halide to form the corresponding 17β-OR'-13β-$R_1$-17α-$R_2$-Δ$^{4,9,11}$-gonatriene-3-one.

In the following example there is described a preferred embodiment to illustrate the invention. However, it should be understood that the invention is not intended to be limited to the specific embodiment.

EXAMPLE
*Preparation of 4-chloro-17β-benzoyloxy-13β-methyl-Δ$^{4,9,11}$-gonatriene-3-one*

While agitating at room temperature, 1 gm. of 17β-benzoyloxy-13β-methyl-Δ$^{4,9,11}$-gonatriene-3-one was dissolved in 20 cc. of pyridine, and then 0.43 cc. of sulfuryl chloride was added very slowly and the agitation was maintained for 30 minutes at 20° C. under atmosphere of nitrogen. The reaction mixture was then treated with water and extracted with methylene chloride. The extract was washed with dilute hydrochloric acid, then with a saturated solution of sodium bicarbonate and finally with water until the wash waters were neutral. The solution was dried, evaporated under vacuum, and a residue was obtained which was subjected to chromatography through silica gel and eluted with methylene chloride containing 2% of acetone. The fraction thus obtained was evaporated to dryness under vacuum, then recrystallized under reflux from isopropyl ether-methanol mixture (1:1), then from isopropyl ether-acetone (1:1) to obtain 105 mg. of 4-chloro-17β-benzoyloxy-13β-methyl-Δ$^{4,9,11}$-gonatriene-3-one having a melting point of 192° C. and a specific rotation $[\alpha]_D^{20}=+392°\pm2°$ (c.=0.5% in chloroform).

The product occurred in the form of prisms insoluble in water, dilute aqueous acids and alkalis, slightly soluble in alcohol and ether and soluble in acetone, benzene and chloroform.

*Analysis.* — $C_{25}H_{25}ClO_3$; molecular weight=408.9. Calculated: C, 73.42%; H, 6.16%; Cl, 8.67%. Found: C, 73.3%; H, 6.1%; Cl, 8.7%.

Infrared spectra in chloroform:
Benzoyloxy group: 1,710 cm.$^{-1}$ C=O
              1,275 cm.$^{-1}$ C—O—
Conjugated triene-one: C=O 1,670 cm.$^{-1}$
              C=C {1,550 cm.$^{-1}$
                   1,530 cm.$^{-1}$
EtOH $\lambda_{max}$ {233 mμ  ε=18,800
                     352 mμ  ε=29,500

This compound is not described in the literature.

In an analogous manner, by the above mode of operation 17β-acetoxy-13β-methyl-Δ$^{4,9,11}$-gonatriene-3-one was reacted with sulfuryl chloride to obtain 4-chloro-17β-acetoxy-13β-methyl-Δ$^{4,9,11}$-gonatriene-3-one having a melting point of 188° C. and a specific rotation $$[\alpha]_D^{20}=+441°$$

(c.=0.5% in chloroform).

Infrared spectra in chloroform:
Acetoxy function: 1,728 cm.$^{-1}$
              1,250 cm.$^{-1}$
Conjugated triene-one: C=O 1,670 cm.$^{-1}$
              C=C {1,593 cm.$^{-1}$
                   1,552 cm.$^{-1}$
                   1,532 cm.$^{-1}$
EtOH $\lambda_{max}$ 351-352 mμ  ε=28,600

This compound is not described in the literature.

In an analogous manner, by the above mode of operation 13β,17α-dimethyl Δ$^{4,9,11}$-gonatriene 17β-ol-3-one was reacted with sulfuryl chloride to obtain 4-chloro-13β,17α-dimethyl Δ$^{4,9,11}$-gonatriene 17β-ol-3-one having a melting point of 156° C. and a specific rotation $$[\alpha]_D^{20}=+411°$$

(c.=0.5% in methanol).

This compound is not described in the literature.

Various modifications of the process of the invention may be made without departing from the spirit or scope thereof and it is to be understood that the invention is to be limited only as defined in the appended claims.

We claim:
1. A 4-chloro-Δ$^{4,9,11}$-gonatriene of the formula

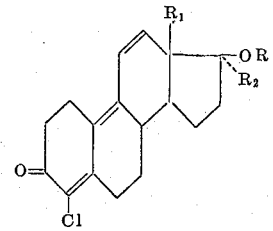

wherein R is selected from the group consisting of hydrogen and an acyl radical of an organic carboxylic acid having 1 to 18 carbon atoms, $R_1$ is the methyl radical, $R_2$ is selected from the group consisting of hydrogen and a lower alkyl radical.

2. 4 - chloro - 17β - acetoxy-13β-methyl-Δ$^{4,9,11}$-gonatriene-3-one.

3. 4 - chloro - 17β-benzoyloxy-13β-methylΔ$^{4,9,11}$-gonatriene-3-one.

4. 4-chloro-13β,17α-dimethyl-Δ$^{4,9,11}$-gonatriene 17β-ol-3-one.

References Cited by the Examiner

Beereboom et al.: J.A.C.S. 75, p. 3500–3505, pages 3500 and 3501 relied on (1953).

Mori: Chem. and Pharmaceutical Bull. 10 pp. 492–432, pages 429–430 relied on (1962).

References Cited by the Applicant

L. Velluz et coll. [C.R. Acad. Sci. T. 257 (1963) p. 569–570].

LEWIS GOTTS, *Primary Examiner.*

HENRY A. FRENCH, *Assistant Examiner.*